United States Patent
Clements et al.

(10) Patent No.: US 8,647,503 B2
(45) Date of Patent: Feb. 11, 2014

(54) FILTER ASSEMBLY FOR FUEL SUPPLY TO ACTUATORS AND FUEL CONTROL SYSTEM OF AIRCRAFT ENGINE AND METHOD

(75) Inventors: Martin A. Clements, North Royalton, OH (US); Robert Nyzen, Hiram, OH (US); John P. Ogger, Lyndhurst, OH (US); William T. Flynn, Horton, MI (US)

(73) Assignee: Eaton Industrial Corporation, Cleveland, OH (US)

( * ) Notice: Subject to any disclaimer, the term of this patent is extended or adjusted under 35 U.S.C. 154(b) by 1467 days.

(21) Appl. No.: 11/935,900

(22) Filed: Nov. 6, 2007

(65) Prior Publication Data

US 2011/0036781 A1    Feb. 17, 2011

Related U.S. Application Data (60) Provisional application No. 60/857,072, filed on Nov. 6, 2006, provisional application No. 60/905,349, filed on Mar. 7, 2007.

(51) Int. Cl.
*B01D 35/157*    (2006.01)

(52) U.S. Cl.
USPC ........ 210/137; 210/433.1; 210/456; 210/194; 210/197; 210/416.4

(58) Field of Classification Search
USPC ........................................................ 210/137
See application file for complete search history.

(56) References Cited

U.S. PATENT DOCUMENTS

| | | | |
|---|---|---|---|
| 3,109,809 A | 11/1963 | Verrando, Jr. | |
| 3,193,102 A | 7/1965 | Bottoms et al. | |
| 3,422,956 A | 1/1969 | Hadden | |
| 3,622,004 A | 11/1971 | Meyer | |
| 5,149,433 A | 9/1992 | Lien | |
| 5,320,755 A * | 6/1994 | Hagqvist et al. | 210/652 |
| 7,172,689 B2 | 2/2007 | Bratten | |
| 7,174,273 B2 | 2/2007 | Goldberg | |
| 7,273,507 B2 | 9/2007 | Schwalm | |
| 2004/0011052 A1 | 1/2004 | Clements | |
| 2007/0102341 A1 | 5/2007 | Marocchini et al. | |

FOREIGN PATENT DOCUMENTS

EP    0 311 162 A    4/1989

OTHER PUBLICATIONS

PCT/US2007/083748 (International Filing Date Nov. 6, 2007), International Search and Written Opinion, mailed Sep. 11, 2008.

* cited by examiner

*Primary Examiner* — Tony G Soohoo
*Assistant Examiner* — Peter Keyworth
(74) *Attorney, Agent, or Firm* — Fay Sharpe LLP (57) ABSTRACT

A filter assembly for a fuel delivery system for actuators and fuel control system of an aircraft engine includes a wash flow filter. Fuel flow velocity is increased through the filter through use of a recirculating passage that is effectively achieved through use of an ejector pump. A portion of the pressurized fuel delivered by the main fuel pump is diverted and serves as a motive fluid that scavenges unfiltered flow from downstream of the filter and recirculates or discharges the recirculated flow to an inlet of the filter. This provides increased velocity to maintain sufficient washing of the filter openings.

27 Claims, 10 Drawing Sheets

FILTER ASSEMBLY FOR FUEL SUPPLY TO ACTUATORS AND FUEL CONTROL SYSTEM OF AIRCRAFT ENGINE AND METHOD

This disclosure relates to, and fully incorporates by reference, U.S. Provisional Application Ser. No. 60/857,072, filed Nov. 6, 2006, and Ser. No. 60/905,349, filed 7 Mar. 2007.

This invention was made with United States Government support under Agreement Number N00019-02-C-3003 awarded by the US Navy. The United States Government has certain rights in the invention.

BACKGROUND OF THE INVENTION

This disclosure relates to a fuel supply system, and more particularly to a filter assembly for fuel fed to actuators and a fuel control system of an aircraft engine, and associated method. More particularly, this disclosure relates to a fuel supply system that employs a wash flow filter assembly, and a means for providing sufficient velocity through the filter to effectively remove material collected on the wash flow filter.

In an aircraft engine, there are times in which the main fuel pump has a substantial amount of flow, while in other instances there is significantly less flow through the pump. Pressurized fuel proceeds from the pump through a simple valve, sometimes referred to in the industry as a system stability valve, that breaks up any feedback between the remainder of the system and pump operation. For example, when a centrifugal pump has a positive sloping head curve there is some instability at lower flow rates while at higher flow rates the system is more stable. Jet engines require operation in a low flow situation so a valve is incorporated into the system downstream of the fuel pump to break up or limit feedback and work better in low flow conditions.

The fuel flow is often split between a fuel control system where the fuel is burned or combusted and for moving actuators. A main filter is intended to filter particle sizes down to 20 microns, although there is a need for a backup filter since assurance of filtered flow to a particle size on the order of 40 microns is important to protect the actuation system that includes, for example, servo valves, etc. Usually, system specifications want a filter that does not have to be serviced. The system is usually pumping more fluid than is needed and thus there is also sufficient flow provided to the wash flow filter to remove the material that collects on the filter surface. However, if a variable pumping system is used, then the system loses the benefit of the high wash flow and there will be times when low wash flow is provided. It is also desirable that the auxiliary filter be small and lightweight, and able to handle a wide range of wash flow It is known that when an actuator holds a position, then generally steady state flow is provided. On the other hand, when the actuators are moved quickly, a lot of flow (e.g., typically greater than four times the steady state flow level) is provided to the actuators. Thus, filtered flow through the wash flow filter can be widely varied and varied relatively quickly. Typically, the amount of fuel that passes through the wash flow filter is not an issue. At engine idle power the amount of flow may be quite low that is delivered to the fuel control system. This flow is low in comparison to the flow to the actuators (actuator flow may be on the order of four times greater). Normally, when a wash flow filter is used, the through flow to the fuel control system would be typically greater than the filtered flow. For example, the through or unfiltered flow would be on the order of five to ten times greater than that of the filtered flow that passes through the filter. In such situations, a low amount of through flow (here, fed to the fuel control system) may result in insufficient wash flow through the filter so that plugging of the filter can result.

During times of system operation encountering such low through flow, a device is needed that can provide increased velocity through the filter, particularly where the flow to the fuel control system is relatively low. A need exists to provide a simple, effective, and cost efficient manner of maintaining sufficient velocity wash flow through the filter at all times to assure good washing of the filter screen with a minimum amount of complexity and service. It is also desirable if such a system could be easily incorporated into known fuel delivery mechanisms.

SUMMARY OF THE INVENTION

A wash flow filter assembly for a fuel supply to an aircraft engine includes a filter having an inlet and a first outlet through which unfiltered flow is delivered to an associated fuel control system, and a second outlet through which filtered fuel flow is delivered. Means for increasing the velocity of fuel flow through the filter to the first outlet is provided.

The velocity increasing means includes means for recirculating flow from the first outlet to the inlet.

A preferred embodiment of the recirculating means is an ejector pump.

The ejector pump receives flow from a fuel pump to provide a motive flow to the ejector pump, and recirculates flow from downstream of the filter to the filter inlet.

The ejector pump uses the change in pressure across a system stability valve to direct a portion of flow from upstream of a system stability valve to supply an ejector pump that serves as the motive flow for the ejector pump recirculating the flow from downstream of the filter to the filter inlet.

A method for filtering fuel flow includes delivering fuel from a pump to an inlet of a wash flow filter, passing an unfiltered, first portion of the fuel flow to a first outlet of the filter that communicates with the associated fuel control system, filtering a second portion of the fuel flow that proceeds to a second outlet that communicates with the associated actuators, and increasing fuel flow velocity through the filter toward the first outlet for effectively washing the filter.

Increasing fuel flow velocity through the filter includes recirculating fuel from the first outlet to the inlet of the filter.

A primary advantage of the invention resides in the ability to effectively remove material from the wash flow filter through a wide range of through flows.

Another advantage of the invention resides in a simple structure that drives up the velocity of through flow, particularly where a reduced amount of flow is provided to the fuel control system as compared to the amount of filtered flow.

Yet another advantage resides in the reliability and reduced complexity associated with the use of an ejector pump to provide sufficient wash flow to the filter.

Still other advantages and benefits of the invention will become apparent to one skilled in the art upon reading and understanding the following detailed description.

DETAILED DESCRIPTION OF THE PREFERRED EMBODIMENTS

Figure 1:
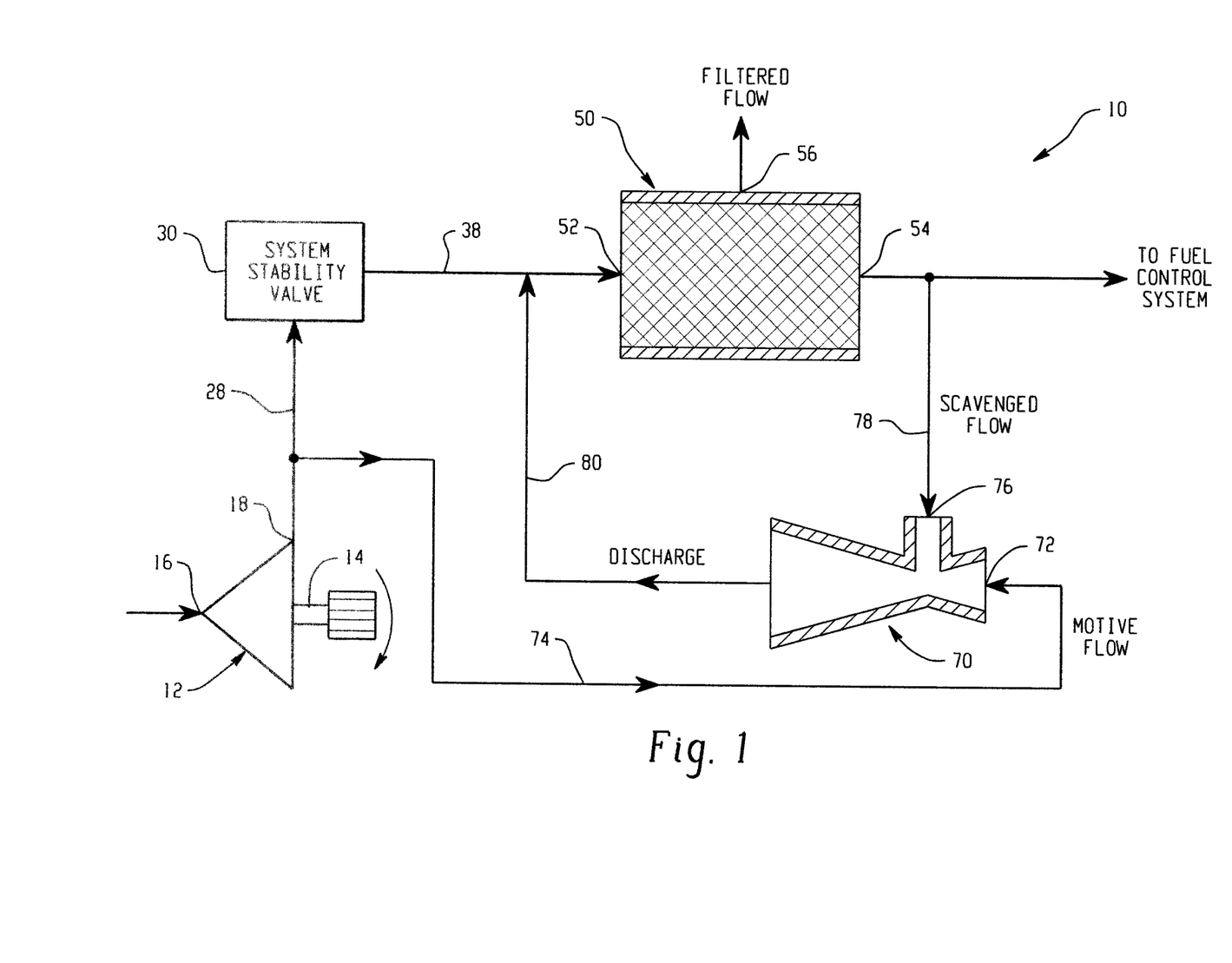
FIG. 1 is a schematic or diagrammatic representation of the fuel supply system.
Figure 2:
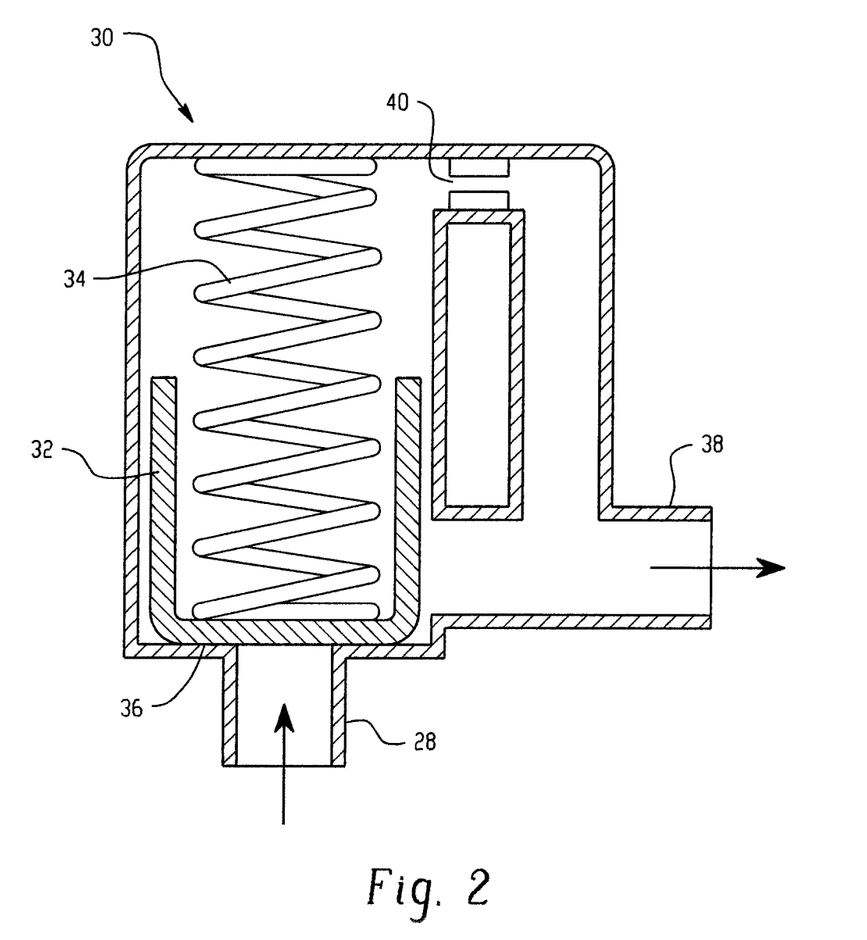
FIG. 2 is an enlarged view of a system stability valve incorporated into the circuit of FIG. 1.

Turning first to FIG. 1, a fuel delivery system 10 includes a fuel pump, such as centrifugal pump 12, rotated by shaft 14 to pressurize flow from a reservoir (not shown) provided to pump inlet 16 and raising pressure to a desired level at pump outlet 18. Pressurized fuel is provided through passage 28 to system stability valve 30 (the structural details of which are represented in greater detail in FIG. 2). More particularly, the valve 30 includes a movable valve or piston member 32 urged to a closed position by a biasing means such as spring 34 such that when a predetermined pressurized flow is introduced at passage 28, the piston is moved away from its valve seat 36 and allows communication with a passage 38 for delivery to a downstream system. Restrictor 40 is also provided in the system stability valve.

The pressurized fuel is delivered to a filter, such as a wash flow filter assembly 50 having an inlet 52 that communicates with a first outlet 54. This unfiltered through flow from inlet 52 to the first outlet 54 continues downstream to a fuel control system where the fuel is combusted or burned and/or a portion of the delivered fuel may be thermally recirculated, as is generally known in the art. A second portion of the pressurized fuel that reaches the wash flow filter passes through the small openings in the filter for communication through second outlet 56 for delivery to, for example, an actuator system (not shown).

As briefly alluded to in the Background section of this application, in instances where low flow is provided to the first outlet and a downstream fuel control system, relative to a higher flow provided to the second outlet 56, plugging of the filter may occur as a result of insufficient velocity or washing flow through the wash flow filter. A need exists, therefore, to improve or increase the washing velocity of the fuel through the filter, and a solution that is particularly effective, reliable, etc. A preferred means for increasing fuel flow velocity through the filter is generally identified by reference numeral 70 and commonly referred to as an ejector pump. The ejector pump has a first port 72 that receives pressurized fuel or motive flow through passage 74. Passage 74 communicates with the outlet 18 of the fuel pump, for example, downstream of the pump outlet 18 at a location between the pump and the valve 30. A second port 76 receives recirculated or scavenged flow from passage 78 that communicates with the first outlet 54 of the filter. The motive flow passes through the narrow opening in the ejector pump and draws increased fuel through the scavenge passage 78 where it is ultimately discharged through passage 80, i.e., recirculated to line 38 upstream of the filter inlet 52 and downstream of the stability valve 30. Thus, the ejector recirculates flow from the first outlet to the inlet of the wash flow filter assembly. In this manner, sufficient fuel velocity is provided through the filter to remove material from the filter openings so that the filter does not become plugged. The ejector pump sufficiently increases the velocity to a level that provides desired washing of the filter screen, and achieves this in a reliable manner that has a minimum amount of complexity.

A change in pressure across the system stability valve is advantageously used to act as a motivator to drive the fluid around the ejector loop and thereby increase the throughflow through the wash filter so that velocities stay high even when there are low amounts of fuel flow being delivered to the associated fuel control system. The ejector pump is not very effective in those instances where a lot of fuel flow is being delivered to the fuel control system. However, this is generally immaterial, since high velocities are passing through the wash flow filter already and thus any filtered contaminants are being washed by the high velocity flow to the fuel control system. That is, ideally it is not as desirable for the ejector to be effective at high flow conditions because there is no need to push as much fuel flow through the wash flow filter.

Figure 3:
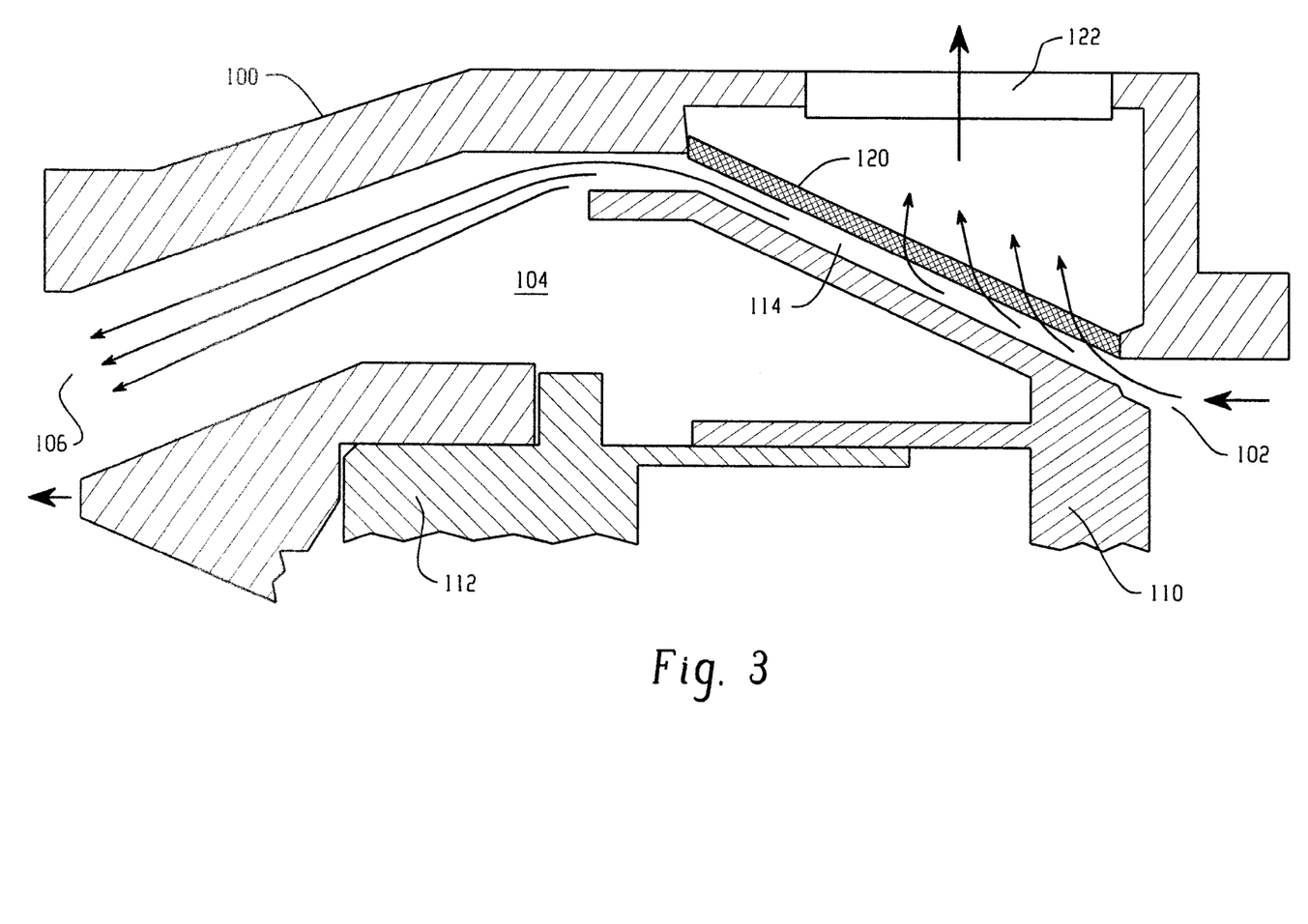
FIGS. 3-5 illustrate three (3) embodiments of the schematic representation of FIGS. 1 and 2.

FIG. 3 illustrates a variable wash flow filter assembly having a housing 100 which includes an inlet 102 that communicates with poppet chamber 104 that further communicates with outlet 106 that, in turn, communicates with the downstream fuel control system. A poppet 110 is selectively urged by a biasing means such as a spring (not shown) toward the inlet 102. The illustrated poppet has a generally truncated conical shape with a small diameter inlet end and a larger diameter outlet end. The exterior surface of the poppet is angled between the inlet and outlet ends generally at the same angle as the housing interior wall, and preferably is parallel or slightly divergent between the inlet and outlet ends, i.e., the poppet has a slightly smaller angle than the housing interior wall. In addition, a guide 112 cooperates with a portion of the poppet to assure guiding movement of the poppet between the inlet and outlet. As shown here, the guide extends from a central portion of the housing, although it will be understood that the housing can be modified so that a portion thereof serves as the guide.

Passage 114 is defined between an external surface of the poppet and an internal wall of the housing. A cross-sectional area of the passage will vary as the poppet moves between open and closed positions, i.e., will increase in cross-section as the poppet moves away from the inlet end, and decrease as the poppet moves toward the inlet 102. In addition, and as previously described, a portion of the inlet flow proceeds through a filter screen 120 which is mounted in the wall of the wash flow filter housing. The filter also has a truncated conical shape in this preferred embodiment and forms the outer surface of the passage 114 in this region of the housing. The filter screen assures that fuel flow passes therethrough before being directed through passage or second outlet 122 for delivery to, for example, an actuator system (not shown). Thus, the assembly illustrated in FIG. 3 is representative of the system of FIGS. 1 and 2 where a separate recirculated or scavenged flow may be provided in order to assure sufficient fuel velocity to the variable wash flow filter assembly and thereby remove material from the filter openings so the filter does not become plugged.

Figure 4:
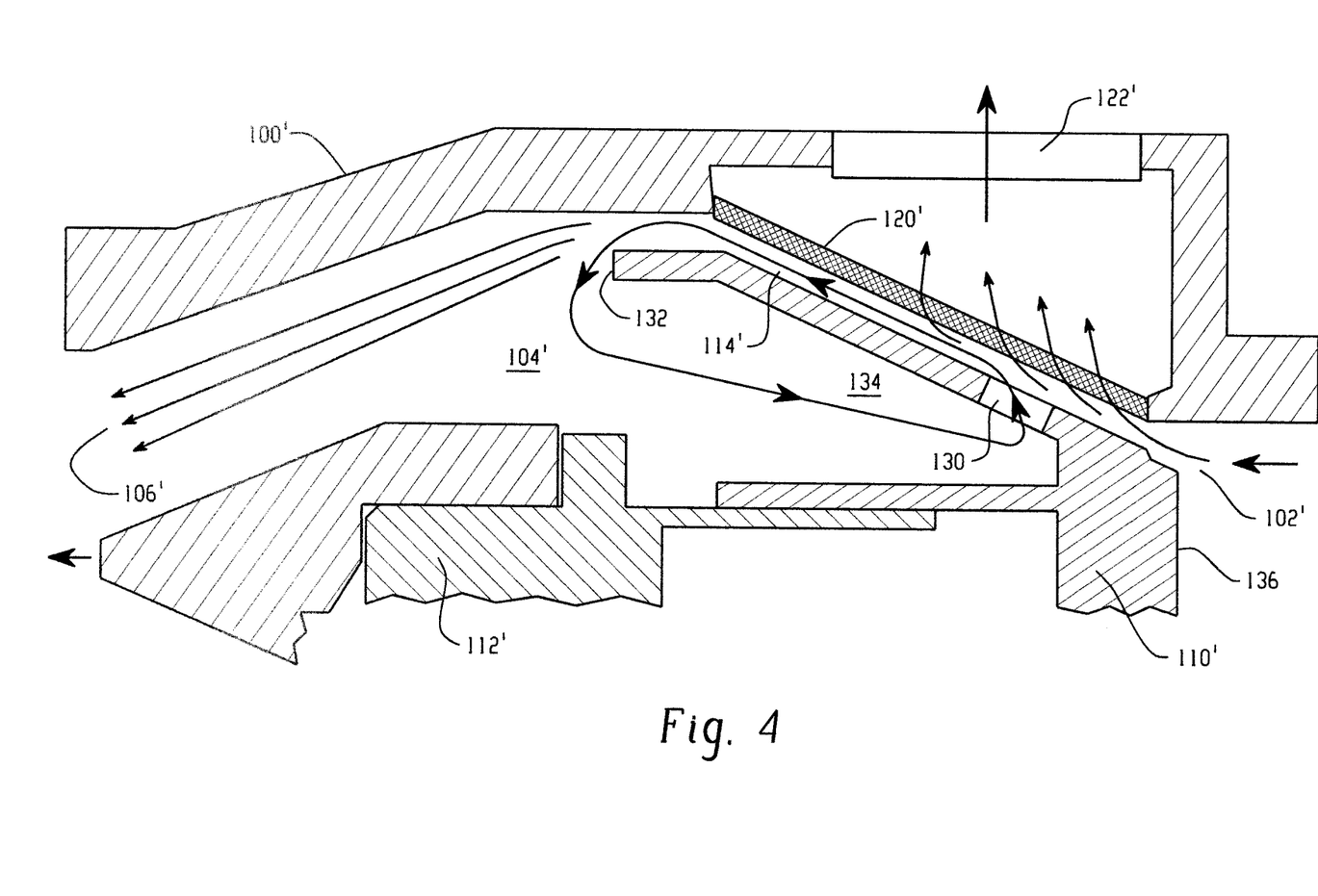

In FIG. 4, the variable wash flow filter assembly of FIG. 3 is modified. For ease of illustration and description, like components are identified by like numerals with a prime suffix ('). For example, poppet 110 in FIG. 3 is now identified as poppet 110' in FIG. 4 and may also use a biasing member/spring with the poppet in this embodiment. New features will be identified by new numerals. Particularly, one modification is the provision of one or more circumferentially spaced openings 130 that are formed in the poppet in order to establish a recirculating flow from a downstream end 132 of the poppet into a poppet chamber 134 (formed by an internal cavity of the poppet member) and through passage(s) or opening(s) 130 disposed more closely adjacent an upstream end 136 of the poppet whereby the recirculating flow is introduced into passage 114'. This addition of the passage 130 serves the same purpose as the means for increasing fuel flow velocity 70 of FIG. 1. That is, the fuel flow velocity through the filter is improved through the use of an ejector pump in the schematic representation of FIG. 1, and the opening 130 that communicates between passage 114' and the poppet cavity 134 serves the same purpose. The change in pressure from the inlet end to the outlet end assists the recirculation flow to assure a sufficient velocity of wash flow across the inner face of the filter screen 120'.

Figure 5:
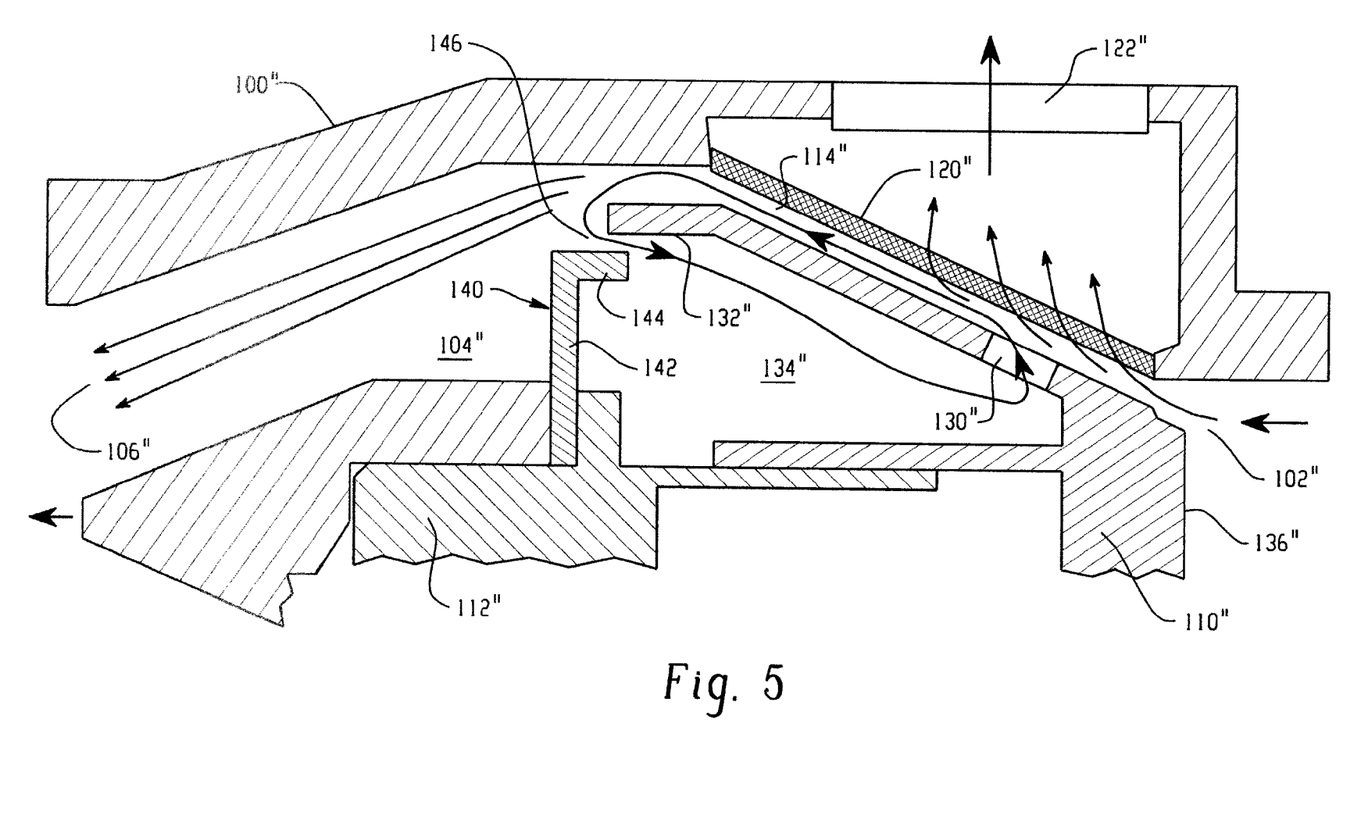

FIG. 5 is yet another embodiment of the variable wash flow filter assembly. Again, it is similar to the embodiments of FIGS. 3 and 4, so that for ease of description and reference, like components will be identified by like numerals with a double-prime suffix. For example, poppet 110 in FIG. 3, is now identified as poppet 110" in FIG. 5. In addition to the opening 130" that communicates between poppet chamber 134" and passage 114", a backing disk or restriction member 140 is provided. Particularly, backing disk 140 includes a generally radially extending portion 142 and an axially extending portion 144 that controls a restriction or passage 146 between the downstream end 132" and the poppet, and communication between the cavity 104" and the poppet cavity 134". By reducing or restricting the recirculation flow through restriction opening 146, the pressure in the poppet cavity 134" is reduced, and thus the overall difference in pressure is also reduced. As will be appreciated, the size of the restriction 146 can be controlled by altering the dimension of radial portion 142 and/or the dimension of axial portion 144 of the backing disk 140. Again, the recirculating flow boosts the wash filter performance in the same manner as described above.

Figure 6:
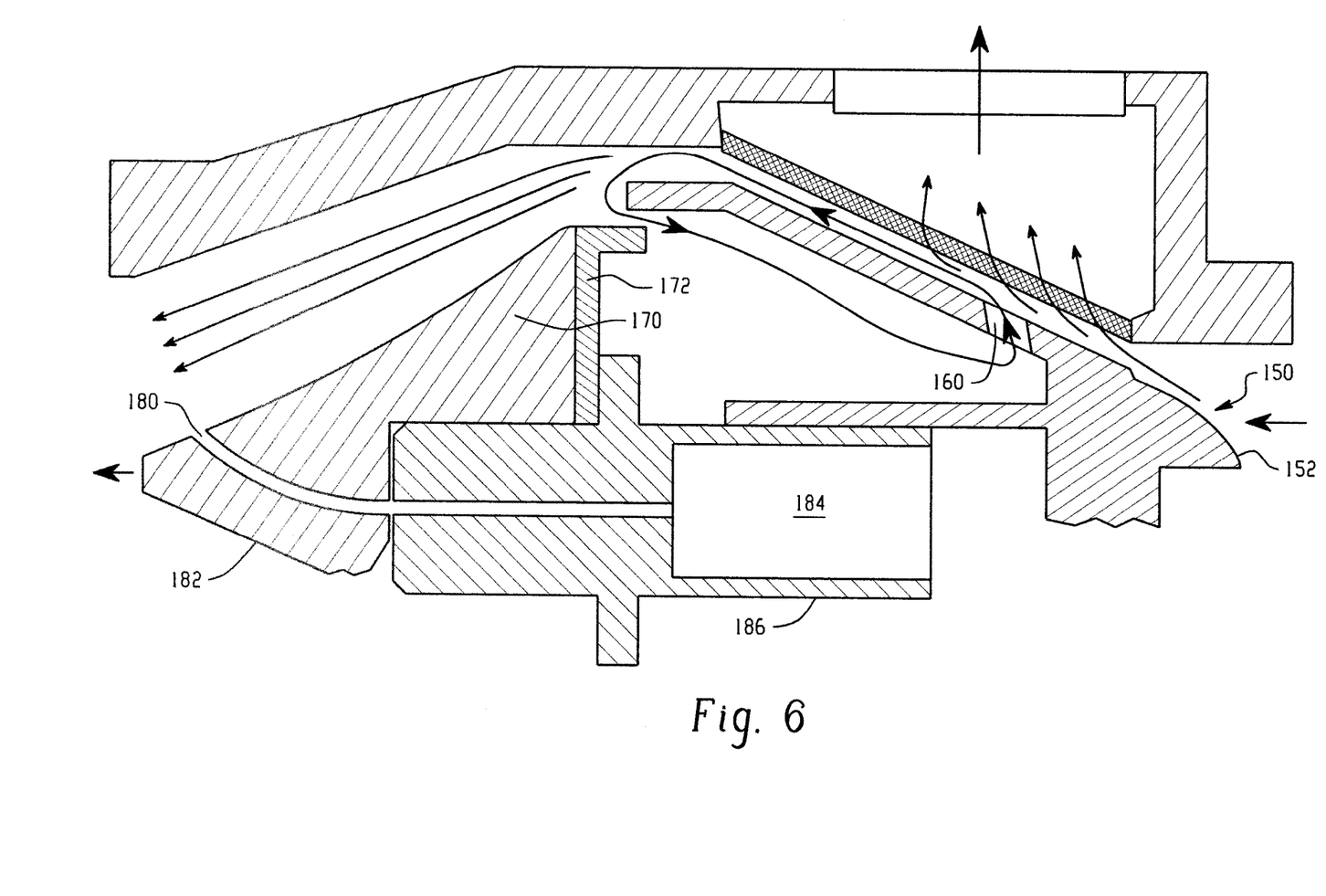
FIG. 6-10 illustrate still further modifications to the wash flow filter assembly.

FIG. 6 is a view similar to FIG. 5 of another embodiment incorporating additional modifications. Again, the descriptions of the prior embodiments are equally applicable here unless particularly noted otherwise, and new features or modifications will be identified by new reference numerals. For example in FIG. 6, an upstream end 150 of the poppet has a smoothly contoured conformation such as an ellipsoidal cap 152 that improves flow around the poppet and thus also improves the delta P or change in pressure over the poppet.

Still another consideration is to modify the orientation of openings 160 though the poppet such as by changing the angle of the openings through the poppet wall to improve flow rate therethrough. For example, openings 160 in the poppet do not have an axis perpendicular to the surface of the poppet through which they penetrate. In this particular instance, the openings are disposed at an angle between 0° (normal to the surface) and 45° so that flow from beneath the poppet as it passes through the openings 160 has a downstream directional component as recirculation flow proceeds through the opening.

Yet another modification is to fill in a region 170 downstream of the backing disk 172. Again, this modification improves the change in pressure from the inlet to the outlet by providing a smooth transition between the downstream edges of these components.

Also shown in FIG. 6 is the addition of one or more venturi ports 180 that communicate between a downstream end of valve body 182 and a central cavity 184 formed, for example, within guide 186. The venturi ports 180 reduce the pressure within cavity 184, again for the purpose of improving the change in pressure between the inlet and outlet of the wash flow filter assembly.

Figure 7:
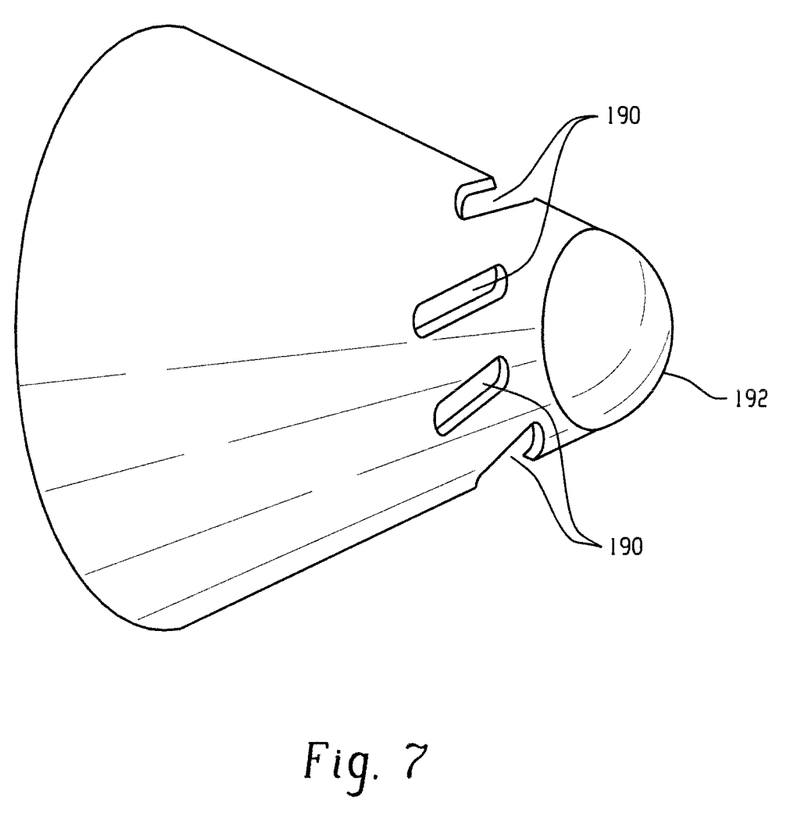

In FIG. 7, further modifications to the recirculation openings are shown as identified by reference numeral 190. A series of circumferentially spaced, elongated, angled openings 190 are disposed at upstream end 192 of the poppet. These elongated slots 190 may be racetrack shaped to enhance the change in pressure between the inlet and outlet and provide additional control to the recirculation flow. One skilled in the art will also appreciate that the upstream end of the illustrated poppet incorporates the ellipsoidal conformation 192 that is similar to the ellipsoidal conformation 152 of FIG. 6.

Figure 8:
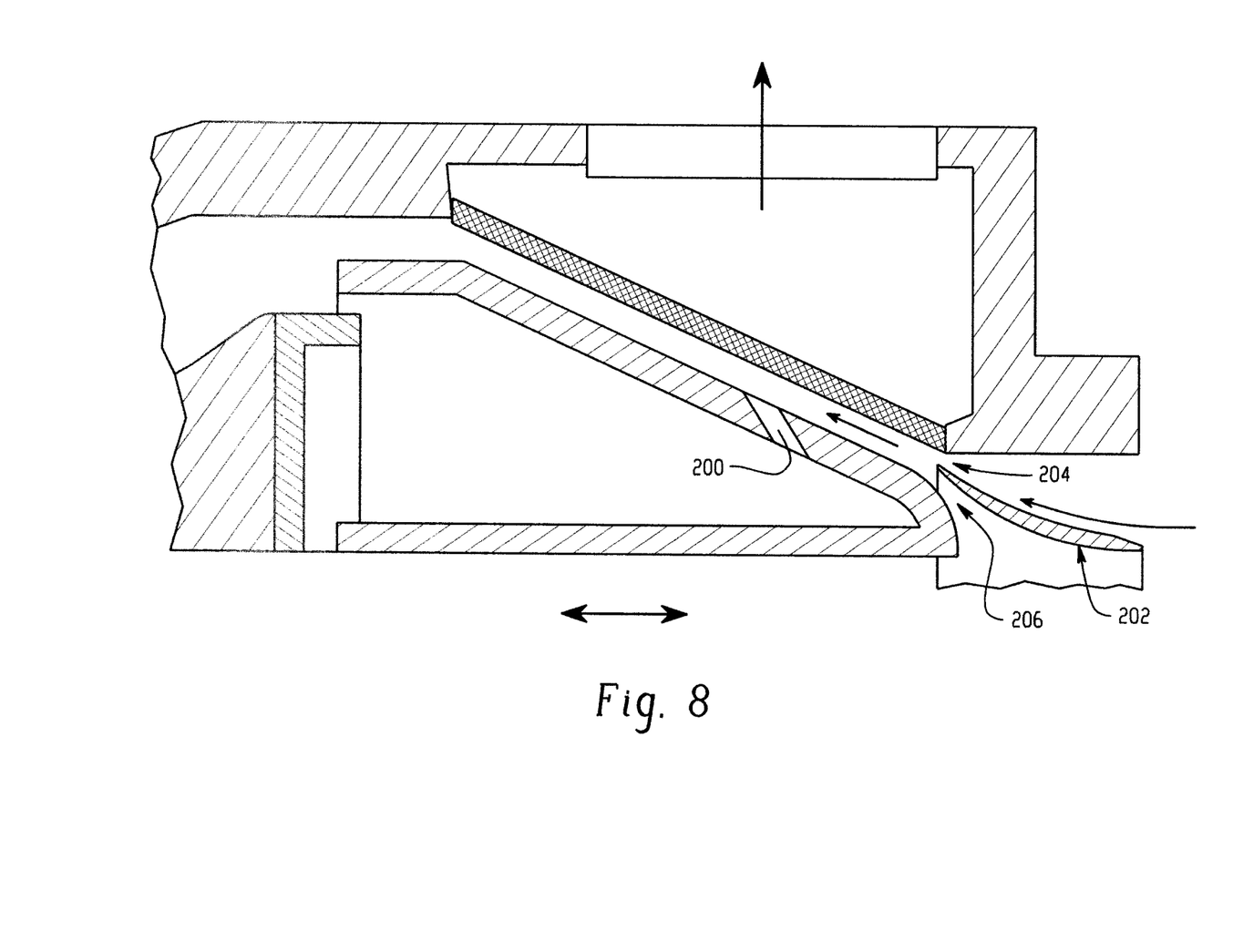

The modifications illustrated FIG. 8 include angled openings 200 that form the recirculation passage through the sidewall poppet. In addition, a fixed inlet nozzle 202 is provided upstream of the movable poppet. The nozzle has a desired swept, aerodynamic design to increase the fluid velocity at low flow conditions. As previously noted, this assures that there is sufficient fluid velocity to remove trapped contaminants on the filter screen during low flow conditions. The inlet nozzle defines a first, radially outer passage 204 that directs flow between the inlet nozzle and the housing and thus directs the flow toward the inner surface of the filter. Likewise, radially inner passage 206 is defined between the nozzle and the movable poppet. Thus, the amount of flow through the radially inner passage will vary depending on the fluid flow through the wash flow filter assembly. That is, as the poppet moves leftwardly in response to increased flow, there is still a substantial portion of flow through the radially outer passage 204, while the radially inner passage 206 opens more widely to accommodate the increased flow.

Figure 9:
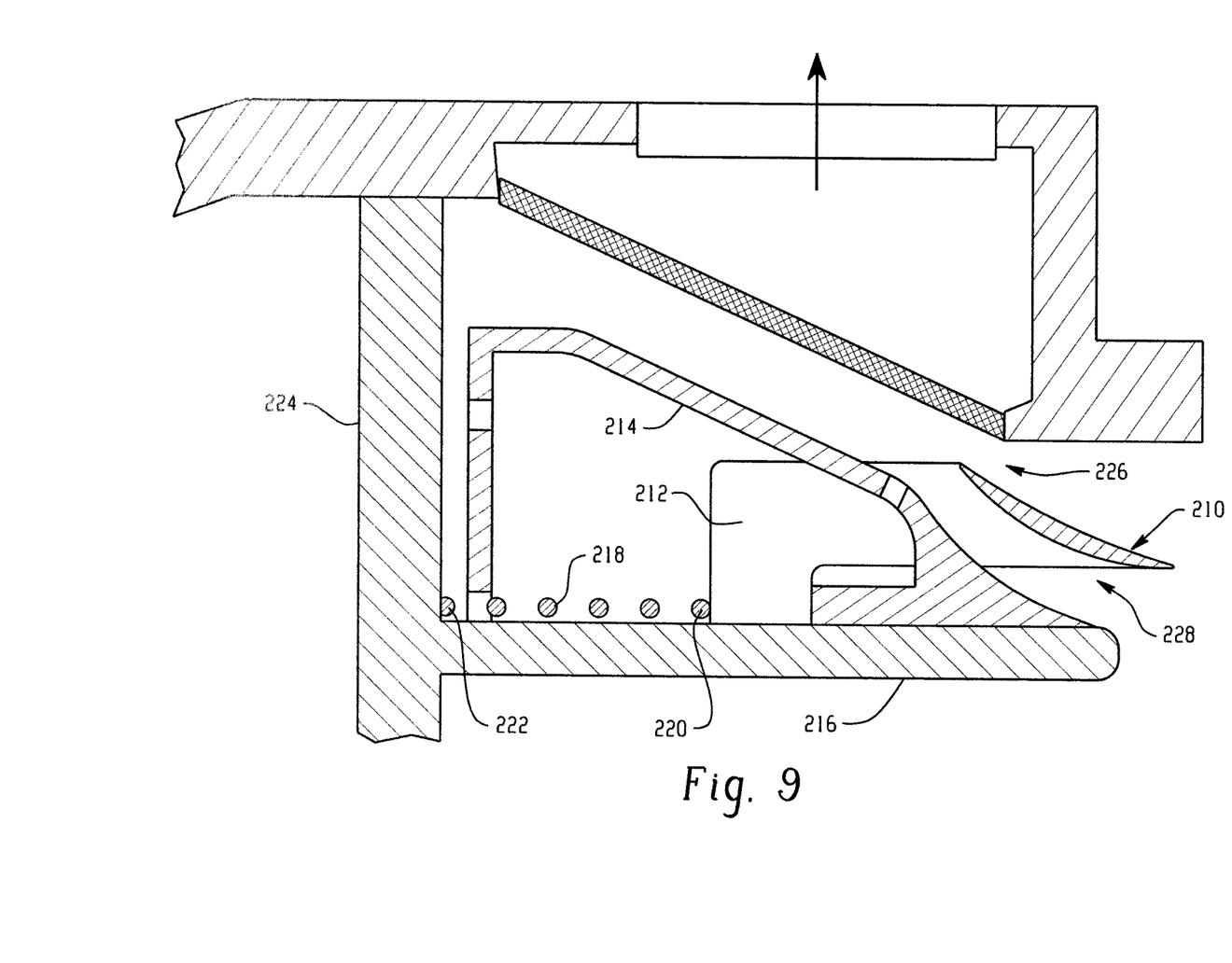

FIG. 9 shows a variation on the use of an inlet nozzle 210. Here, inlet nozzle 210 is axially movable rather than being fixed relative to the housing as in the embodiment of FIG. 8. This axial motion is responsive to the inlet flow and thereby modulates the velocity of the washing fluid across the filter element based on inlet flow rate. The inlet nozzle includes individual arms 212 that extend through the poppet 214. In this particular instance, the poppet 214 is fixed relative to the body, in particular it is fixed relative to guide 216. Preferably, the nozzle 210 is urged toward the inlet end by biasing means or spring 218. A proximal or upstream end 220 of the spring engages the arm 212 while a downstream or distal end 222 engages the guide arm 224. At low flow rates, the spring 218 urges the movable nozzle toward the inlet (i.e., rightwardly as shown) so that the nozzle is disposed to direct a predetermined portion of the low flow rate to the inner surface of the filter. At higher flow rates, the movable nozzle moves leftwardly and compresses the spring so that arm 212 no longer abuts the poppet body, and the first passage 226 has a predetermined cross section to assure sufficient flow at low flow rates across the inner surface of the filter element. Likewise, the second or radially inner passage 228 formed between the movable nozzle and the poppet will be reduced in cross section at higher flow rates. It will be further appreciated that the downstream arms 224 of the guide element are circumferentially or have passages (not shown) at circumferentially spaced locations to permit the flow to proceed through the wash flow filter assembly toward the housing outlet.

Figure 10:
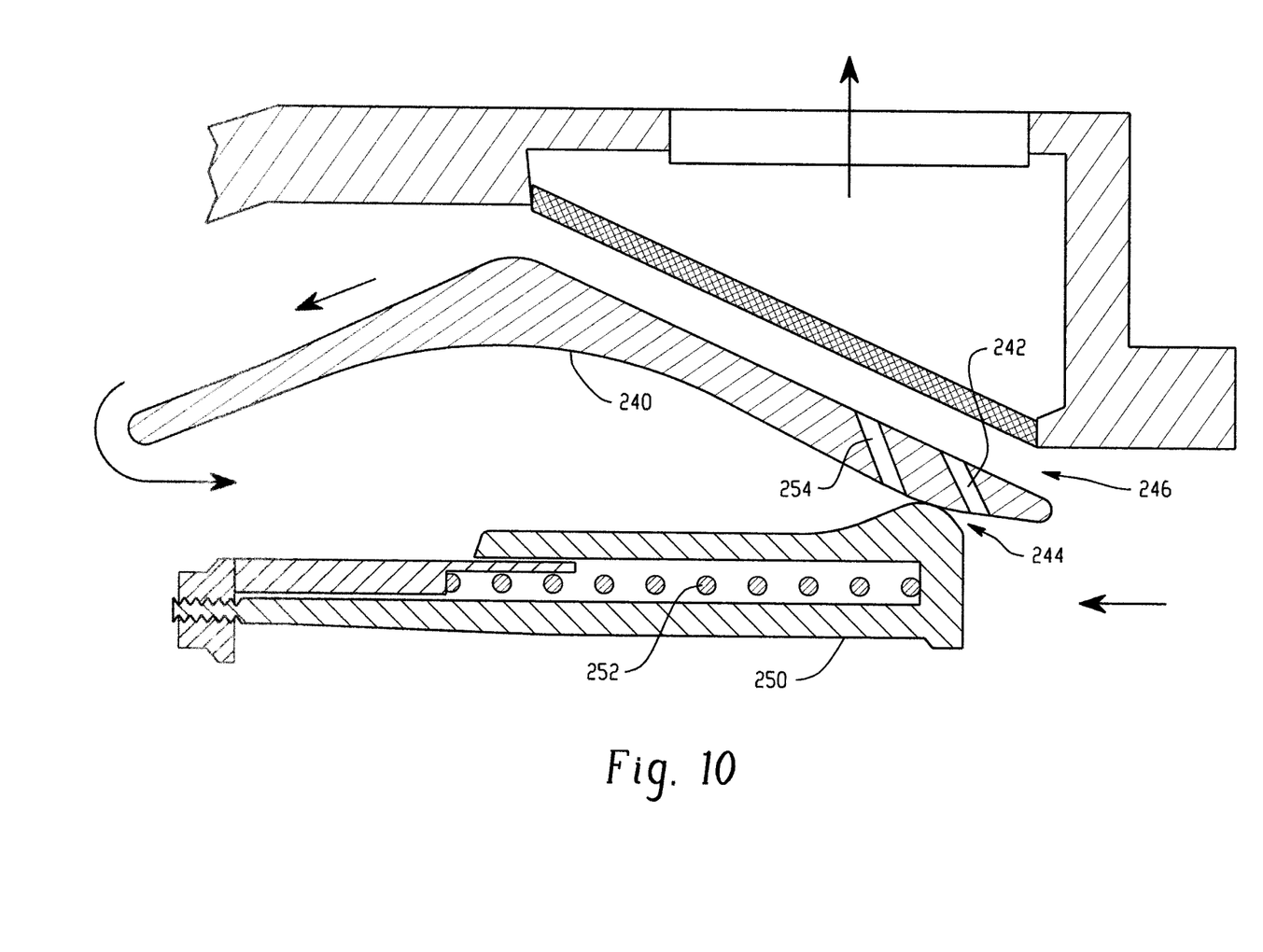

FIG. 10 includes a variant system for assuring sufficient flow at low flow rates. Particularly, a fixed diverter 240 includes a first or upstream passage 242 that interconnects radially inner and outer passage portions 244, 246, respectively, that otherwise separated by the diverter. Poppet or valve member 250 is biased toward the inlet by spring 252 so that at low flow conditions the passage 244 is substantially shut off. At higher flow rates, however, the spring 252 is compressed as the poppet moves leftwardly in response to the increased flow. This movement of the poppet increases the cross-section area of passage 244 and also establishes communication with the recirculation passage 254. Thus, at low flow rates, passage 242 enhances the amount of flow directed toward the inner surface of the filter. Likewise, recirculation passage 254 receives recirculation flow from a downstream end of the diverter to enhance the amount of wash flow over the inner surface of the filter. At higher flow rates, though, the recirculation passage 254 is no longer necessary so that as the poppet 250 moves leftwardly or opens further, to allow greater flow through passage 244 during median and high flow rates. Thus during low flow rates, recirculation passage 254 operates in the same manner as described with respect to the earlier embodiments. At median to high flow rates, however, flow passage 244 operates in conjunction with the boost flow passage 242 and passage 246 to distribute the flow through enlarged radial passage 244 toward the filter.

The invention has been described with reference to the preferred embodiments. Obviously, modifications and alterations will occur to others upon reading and understanding the preceding detailed description. It is intended that the invention be construed as including all such modifications and alterations.

Having thus described the invention, it is now claimed:

1. A wash flow filter assembly for use in an associated aircraft engine, the assembly comprising:
   a housing having an inlet and first and second outlets in fluid communication with one another;
   a filter disposed along a fluid path between the inlet and the first outlet whereby filtered material separated by the filter is washed therefrom and carried by throughflow fluid to the first outlet;
   the second outlet located downstream of the filter from the inlet and receiving filtered fluid flow therefrom;
   a movable poppet disposed along the fluid path for varying the amount of flow along the fluid path; and
   a recirculating passage in the movable poppet for redirecting at least a portion of throughflow from a location downstream of the poppet toward an upstream end of the poppet along the fluid path.

2. The assembly of claim 1 further comprising a biasing member for urging the poppet toward a first position.

3. The assembly of claim 1 further comprising a guide member for controlling movement of the poppet.

4. The assembly of claim 1 wherein the poppet is urged toward the inlet by a biasing spring, and the fluid path is generally an annular passage formed between the poppet and housing.

5. The assembly of claim 4 wherein the filter is generally frustroconical.

6. The assembly of claim 1 wherein the recirculating passage includes at least one passage through the poppet.

7. The wash flow filter assembly of claim 1 further comprising:
   a pump for pressurizing associated fuel flow;
   the filter located downstream of the poppet; and
   a fuel flow velocity increasing assembly that maintains a desired velocity of fuel flow during low flow conditions including the recirculating passage recirculating a portion of fuel flow from the first outlet, an ejector pump for increasing fuel flow velocity to the first outlet of the wash flow filter, wherein the ejector pump receives flow from the pump at a location upstream of the poppet to provide a motive flow to the ejector pump, and recirculates flow from downstream of the filter to a location at least partially upstream of the filter.

8. The wash flow filter assembly of claim 7 wherein the motive flow of the ejector pump branches from downstream of the pump and upstream of the valve.

9. The wash flow filter assembly of claim 8 wherein a recirculation inlet of the ejector pump receives through flow from the first outlet.

10. The wash flow filter assembly of claim 9 wherein a recirculation outlet introduces flow from the ejector pump to the upstream location along the fluid path.

11. The wash flow filter assembly of claim 10 wherein the recirculation outlet introduces flow downstream of the poppet.

12. The wash flow filter assembly of claim 7 wherein a recirculation inlet of the ejector pump receives through flow from the first outlet.

13. The wash flow filter assembly of claim 12 wherein the ejector pump receives through flow from upstream of the associated fuel control system.

14. The wash flow filter assembly of claim 7 wherein a recirculation outlet introduces flow from the ejector pump at least partially upstream of the filter and downstream of the valve.

15. The wash flow filter assembly of claim 7 wherein a recirculation inlet of the ejector pump receives through flow from the first outlet and upstream of the associated fuel control system.

16. The wash flow filter assembly of claim 1 further comprising a biasing member that urges the poppet toward a first, low flow position.

17. The wash flow filter assembly of claim 16 wherein the recirculation passage extends through the poppet for recirculating toward the inlet a portion of the flow directed toward the first outlet.

18. The wash flow filter assembly of claim 17 wherein the poppet includes an internal cavity that interconnects a downstream restriction with a recirculating opening.

19. The wash flow filter assembly of claim 17 further comprising a venturi passage that communicates between the outlet and the internal cavity.

20. The wash flow filter assembly of claim 17 wherein the recirculation passage includes elongated openings through the poppet.

21. The wash flow filter assembly of claim 20 wherein the openings are angled relative to a longitudinal axis of the poppet.

22. The wash flow filter assembly of claim 16 further comprising a nozzle fixed relative to the filter.

23. The wash flow filter assembly of claim 22 wherein the nozzle includes a first passage that is normally open during low flow and a second passage that is restricted during low flow.

24. The wash flow filter assembly of claim 23 wherein the biased poppet is urged to restrict communication between the inlet and second passage.

25. The wash flow filter assembly of claim 22 wherein the nozzle directs fuel flow toward the filter.

26. The wash flow filter assembly of claim 16 further comprising a nozzle that moves relative to the filter.

27. The wash flow filter assembly of claim 26 wherein the nozzle is urged by the biasing member toward a first position directing fuel flow toward the filter.

* * * * *